May 2, 1967  C. NEWSTEAD  3,317,010
VEHICLE BRAKES

Filed Jan. 27, 1966  5 Sheets-Sheet 1

United States Patent Office 3,317,010
Patented May 2, 1967

3,317,010
VEHICLE BRAKES
Charles Newstead, Walsall, England, assignor to Girling Limited, Birmingham, England, a British company
Filed Jan. 27, 1966, Ser. No. 523,421
Claims priority, application Great Britain, Oct. 27, 1965, 45,398/65
7 Claims. (Cl. 188—78)

This invention concerns brakes and relates more particularly to vehicle brakes of the kind in which one or more friction elements is or are arranged to be displaced into engagement with a braking surface by wedge-type actuating means.

It is usual in wedge-type actuating means for one or more wedges or equivalent members to cooperate with balls or rollers arranged between the or each wedge and complementary surfaces, in such a way that when the or each wedge is moved in a brake operating direction, an operating movement is transmitted by the balls or rollers to the friction element or elements. The balls or rollers may be freely arranged between the wedge and the complementary surfaces, or they may be arranged in a cage member which is intended to maintain them "in phase" when not under actuating load.

According to the present invention, in a vehicle brake assembly including a housing having wedge-type actuating means for displacing at least one friction element into an operative position and roller means interposed between a wedge member of the actuating means and the cooperating wedge surface of the friction element or of a plunger member associated therewith, the roller means is retained and guided by a cage member which is arranged to be movable in the direction of the wedge member and also to be capable of tilting relative to said wedge member and the cage member is guided within passage means in said housing.

Preferably, the passage means is a bore in the housing or a sleeve carried by or forming part of the housing, and the cage member is formed with bearing means cooperating with the wall of the sleeve or of the housing bore to enable the cage to tilt while remaining unstressed in all conditions of operation of the actuating means.

Under these circumstances the cage may be much less robust than has hitherto been usual and, although it may be made in metal as hitherto, it may alternatively be made more cheaply in a plastic material by moulding, with consequent simplification in production and in quality control since all the critical dimensions required in the cage are automatically established in the mould. Conveniently, the bearing means may be provided by curving or bulging a part of the cage to fit the sleeve or the housing passage or bore, thereby enabling the cage to rock within the latter.

Figure 1:
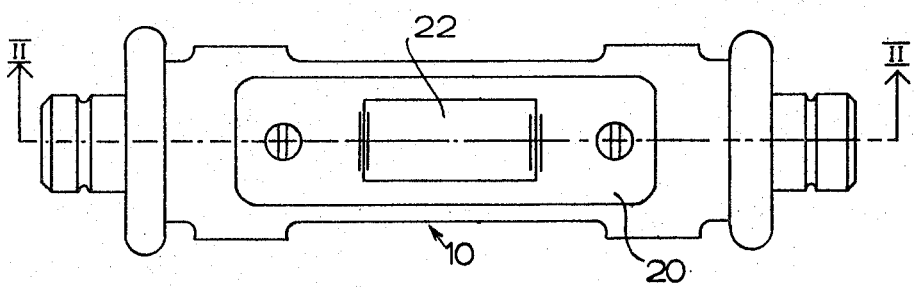
Figure 3:
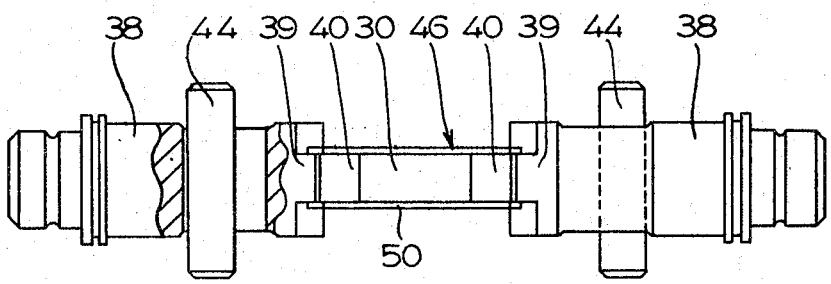
Figure 6:
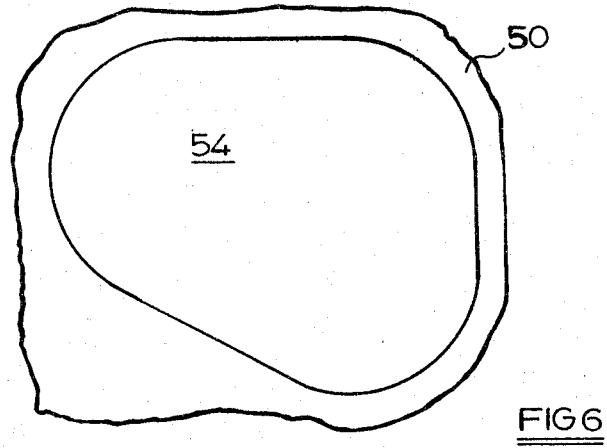
Figure 2:
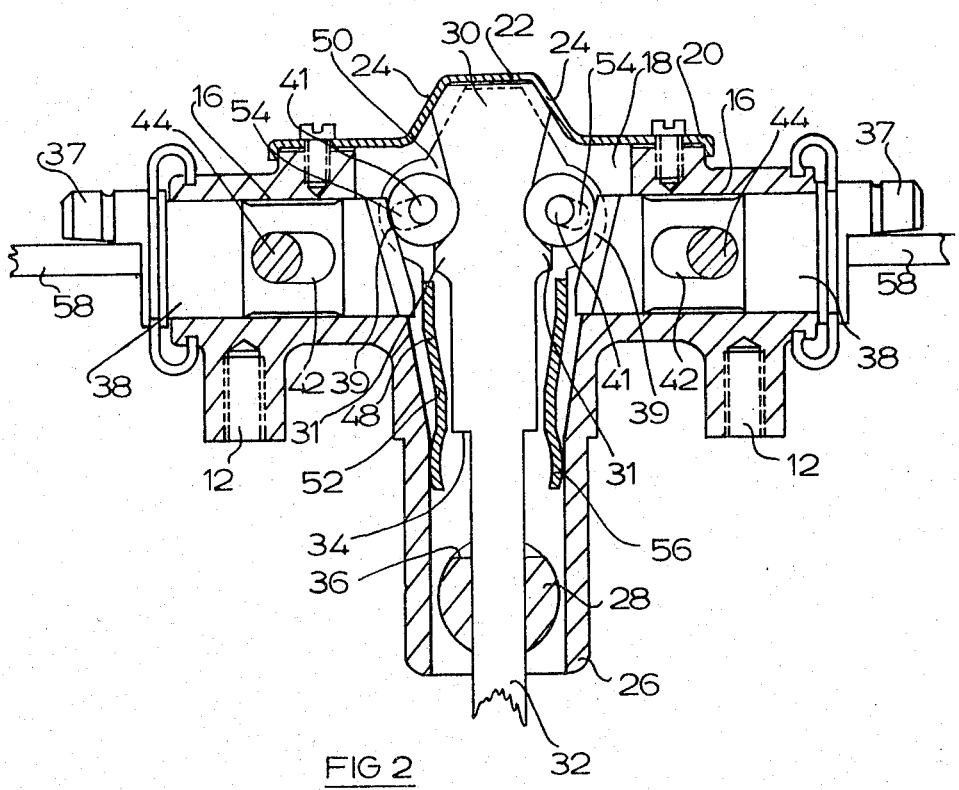
Figure 4:
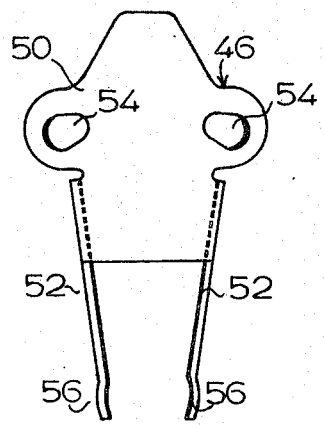
Figure 5:
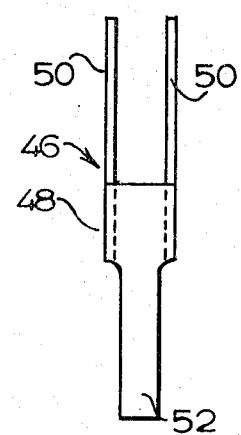
Figure 7:
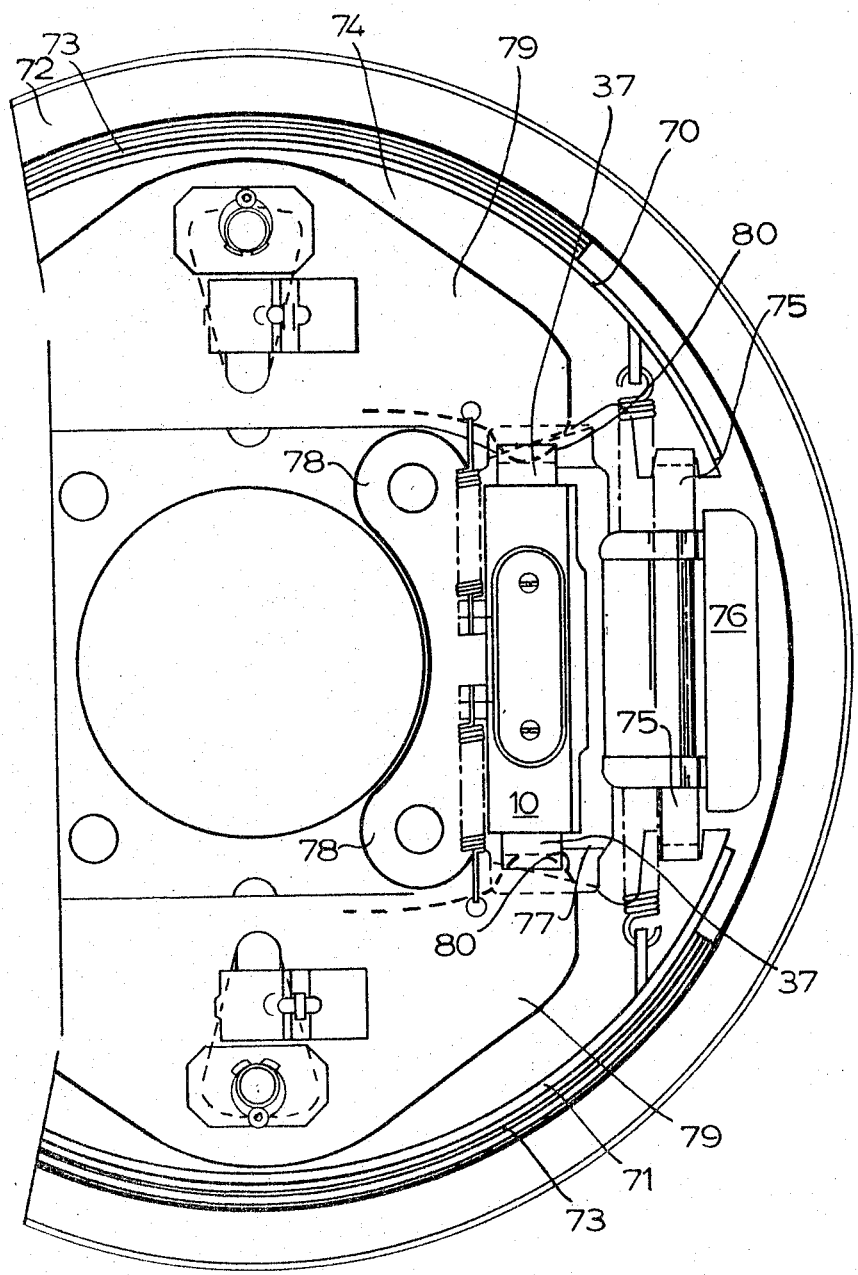
Figure 8:
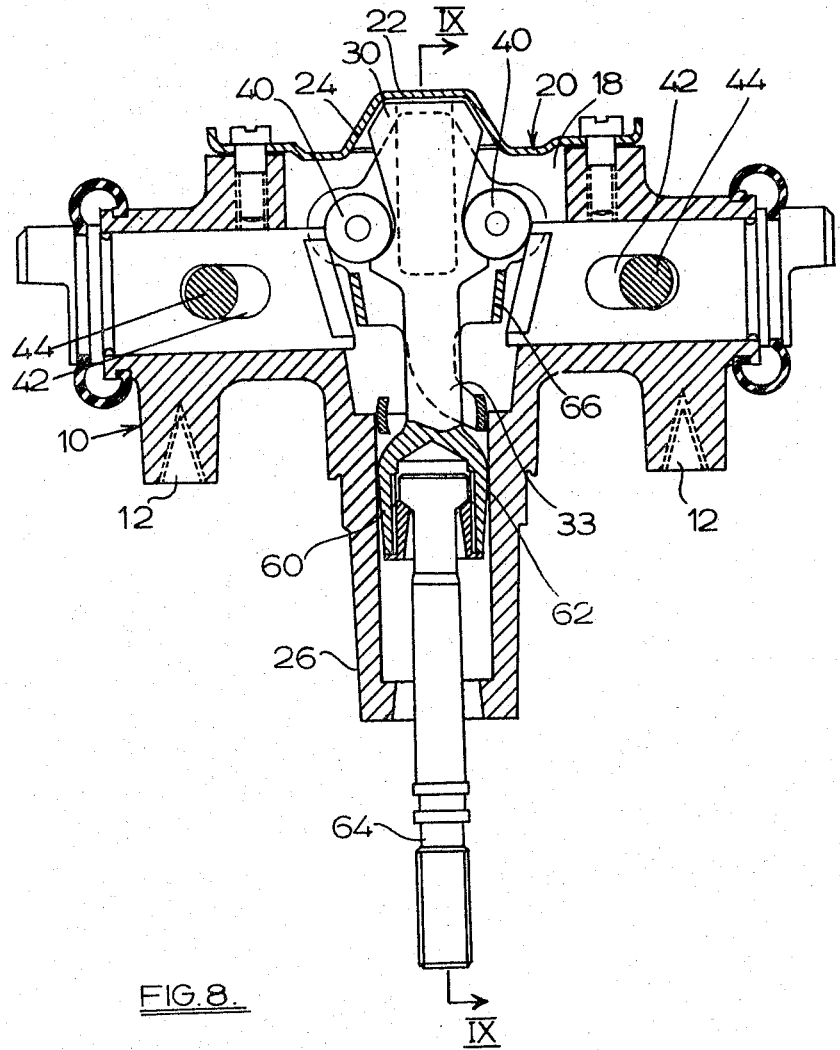
Figure 9:
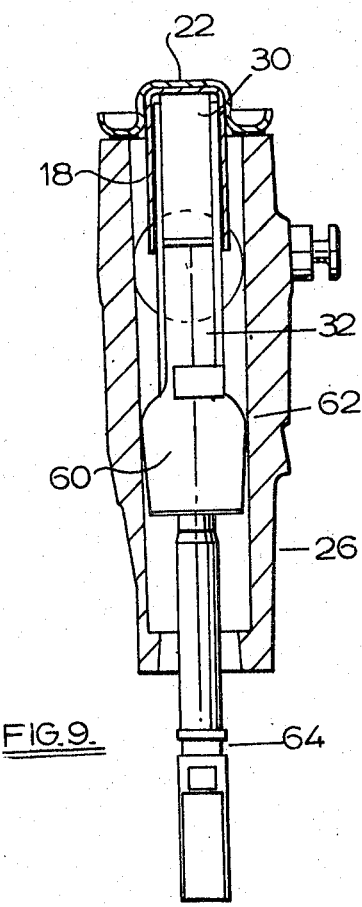

The invention will be described further, by way of example, with reference to the accompanying drawings, in which:

FIG. 1 is a front elevation of a brake actuating or expander mechanism embodying the invention, FIG. 2 is a section taken on the line II—II of FIG. 1, FIG. 3 is a detail, partly in front elevation and partly in section, of the tappet, roller and wedge member assembly, FIGS. 4 and 5 are details of the cage, FIG. 6 is a development of the preferred shape of roller spindle receiving hole in the cage, FIG. 7 is a front elevation, with parts omitted for clarity, of a vehicle brake assembly incorporating the illustrated actuating or expander mechanism, FIG. 8 is a section similar to that of FIG. 2 of another brake actuating or expander mechanism embodying the invention, and FIG. 9 is a section taken on the line IX—IX of FIG. 8.

In the expander mechanism shown in FIGS. 1 to 3, a housing 10 which is adapted by means of screwed holes 12 to be secured to a brake backplate (not shown) is formed with a pair of opposed bores 16 each opening at its inner end into a central axial chamber 18 of the housing, the chamber 18 being closed at its forward end by means of a cover 20 having a central, flat-topped, domed portion 22 with inclined sides 24. The housing 10 is also formed with a rearwardly extending axial sleeve 26 which has a rectangular bore and which passes through a hole in the brake backplate. The sleeve 26 carries a trunnion 28 wherein is mounted the stem 32 of a wedge member 30 lying axially along the sleeve. Spring means (not shown) is provided to bias the wedge member, when not operated, into an inward position in the housing 10 in which the front end of the wedge member seats against and is centered by the inclined sides 24 of the cover dome 22. The trunnion 28 enables the wedge member to rock about the axis of the trunnion, while the wedge member stem 32 is formed with a lateral step 34 which cooperates with a flat 36 provided on the trunnion where the stem 32 passes through it, the step 34 serving to determine the maximum stroke of the wedge member.

Within each of the housing bores 16 is arranged a tappet or plunger member 38, the inner end of each tappet having an inclined face generally parallel to the cooperating face of the wedge member and extending into the chamber 18 adjacent the wedge member. It may be noted here that it is preferred to provide the wedge member stroke determining means 34, 36 between the wedge member and (in effect) the housing 10 rather than between the housing and the tappets 38 because the forces exerted by the tappets are greater than the actuating load on the wedge member in view of the mechanical advantage which results from the wedge mechanism.

A roller 40 is positioned between each operative inclined surface of the wedge member and the cooperating inclined inner end surface of each tappet. The tappets are longitudinally slotted intermediate their ends as indicated at 42, while pins 44 secured to the housing 10 and passing transversely through the bores 16 also pass through the tappet slots 42 and may act firstly to establish the rest position of the tappet within the housing (the tappets being biased into position by the conventional shoe retraction springs—not shown), secondly to prevent rotation of the tappets in the housing and thirdly to control the outward movement of each tappet in its bore 16. In this latter connection, it will be appreciated that in a brake assembly having separate adjusters for each shoe, if adjustment of one of the shoes is overlooked, for example when the vehicle is serviced, then the wedge member may travel through its entire stroke without applying any of the brakes. By virtue of the stop which is provided by the slot 42 and pin 44 in this invention, however, it is ensured that if the brake remains unapplied after the wedge member has completed part of its stroke, then when the lost motion represented by the slot is taken up in the tappet of the unadjusted shoe, the tappet thereupon acts as an abutment against which the wedge member operates to apply the other shoe.

In order to maintain the rollers 40 in proper alignment and in phase with one another during a brake-applying movement of the wedge member, a cage 46 (FIGS. 4 and 5) is slidably guided in the sleeve 26 of the housing 10 and comprises a generally rectangular, box-shaped centre portion 48 from which project a pair of forwardly directed arms 50 extending from one pair of opposite sides of the box and a pair of rearwardly directed arms 52 extending from the other pair of box sides. The free ends of the forwardly directed arms 50 normally abut the dome 22 of the cover 20 to establish the rest position of the cage, while at their mid portions, the arms 50 are formed with a pair of spaced quasi-triangular or generally pear-shaped holes 54 for receiving the spigotted ends 41 of the rollers 40. The inner ends 39 of the tappets 38 are machined to pass between the spaced arms 50 so that the cage 46 and the rollers are centralised with respect to the axis of the tappets. The free end regions of the rearwardly extending arms 52 are outwardly part-cylindrical at 56 to provide a bearing by means of which the cage is enabled to rock about either arm 52 while the other arm 52 guides the cage by rolling along the sleeve 26 rather than by sliding relative to it.

Although it will be appreciated that the holes provided in the cage arms for the roller spigots may be simple clearance holes, the preferred shape is that illustrated by the holes 54, that is to say, having an outline corresponding substantially to the minimum area swept by the roller spigots 41 when the latter are moved through all the positions which it is possible for them to assume when the wedge member moves through its actuating stroke and through its angular movement about the trunnion axis. As already indicated, this outline is generally pear-shaped, that is to say, substantially in the form of a triangle, approximately a 30°-60°-90° triangle modified as shown in FIG. 6 by having its apices appropriately radiused to accept the curvature of the roller spigots 41. As will be evident from FIGS. 2 and 4, the holes 54 are directed generally transversely of the arms 52, with their narrowest ends innermost and their major axes slightly rearwardly inclined. Thus, when the wedge member is in its rest position, the roller spigots 41 are seated at the inner ends of the holes 54, that is to say, at their narrowest ends, and the rollers 40 themselves are seated against curved shoulders 31 provided at the rear ends of the wedge member inclined faces.

In the operation of the mechanism provided by the invention, the wedge member is displaced in a brake applying direction by a pull exerted on the stem 32, with the result that the wedge member moves rearwardly in the sleeve 26 and the rollers are spread apart to force the tappets to move into their bores 16, the outer ends 37 of the tappets being arranged to act against a friction element such as the web 58 of a brake shoe. When the mechanism is under load, should the rollers become slightly out of phase with one another, for example due to unequal tappet displacement, the cage 46 becomes angularly displaced but, since it is rockably mounted by virtue of the bearing 56, the cage remains unstressed. Accordingly, since the cage operates in an unstressed environment, it may be of a lighter construction than is usual in cages of conventional construction, and conveniently, it may be moulded in a plastic material. As will be appreciated, the angle through which the wedge member is able to rock in the trunnion 28 must not approach the angle corresponding to the coefficient of friction for the rolling surfaces, and with this in mind, to maintain the wedge rocking angle at a minimum, the distance between the inclined operating faces of the wedge member and the effective pivot point of the trunnion 28 is kept as large as possible.

Although the invention has been described thus far with reference to two movable tappets 38, it is, of course, alternatively possible to fix one of the tappets relative to the housing 10 so that it constitutes an abutment against which the other tappet is expanded. In these circumstances, with the single movable tappet performing all the brake applying movements, the lost motion in the slot 42 of the working tappet will be the sum, that is to say twice the lost motion, of the individual motions of the tappets in the illustrated construction.

In FIG. 7, a mechanical brake actuator such as that described above is shown incorporated in a vehicle drum brake assembly, in which a pair of opposed arcuate brake shoes 70 and 71 are mounted on a stationary backplate 72 and carry friction linings 73 adapted to engage a rotatable brake drum (not shown). Each shoe has a radial web 74, and at the ends of the shoes, the webs 74 are received in notches in the outer ends of tappets 75 having their inner ends engaged with the piston means of conventional hydraulic actuators 76, of which only one actuator is visible in FIG. 7.

The housing 10 of the mechanical actuator is arranged adjacent one of the hydraulic actuators 76 and is bolted to a bracket 77 which in turn is provided with flanges 78 by which it is secured to the backplate 72. The outer ends 37 of the tappets 36 provide abutments for corresponding ends 80 of arcuate carriers or levers 79 located at one side of the shoe webs, and it will be seen that, when the mechanical actuator is operated as already described, the ends 80 of the carriers 79 are separated to move the shoes 70 and 71 into engagement with the brake drum.

Turning now to the embodiment of the invention shown in FIGS. 8 and 9, it will be noted that in place of the trunnion 28 employed in the actuator of FIGS. 1 to 6, the stem 33 of the wedge member terminates in an internally hollow rear end 60 having an externally part-spherical periphery 62 fitting closely in a cylindrical bore in the housing sleeve 26 and by means of which the wedge member is enabled to rock relative to the housing 10. A part-spherically ended pull rod 64 is seated within the hollow stem end 60 of the wedge member 30 to enable the wedge to be displaced in a brake applying direction. Apart from some minor modification to the configuration of the cage, indicated at 66 in FIGS. 8 and 9, this embodiment of the invention is otherwise constructed and operates in a manner identical to that of the preceding embodiment. The parts corresponding to the parts 56 are spherically curved in this embodiment to fit the cylindrical bore in the housing.

I claim:

1. In a vehicle bake assembly comprising a rotor, at least one friction element displaceable towards and away from braking engagement with said rotor, an actuator housing, a wedge member movable in the housing, friction element displacing means in said housing including complementary inclined surfaces one on each side of said wedge member, and at least one roller interposed between each inclined surface and the cooperating surface of said wedge member, the improvement comprising a cage retaining and guiding the rollers between the wedge member and said inclined surfaces, said cage being movable in the direction of longitudinal movement of the wedge member and additionally being capable of tilting relative to said wedge member, passage means in the housing, and bearing means on the cage cooperating with the wall of said passage means, said housing comprising a support formed with a central chamber, a pair of cylinders extending in opposite directions from said support and having their ends opening directly into said chamber of the support, and a plunger member slidable in each cylinder and having an inclined inner end, the wedge member having a wedge-shaped, free inner end presenting within said chamber, inclined surfaces which are in spaced relation to corresponding inner end surfaces of the plunger members, and wherein said roller cage comprises a body portion circumscribing the wedge member, a first pair of arms extending from one end of said body portion into said chamber for supporting rollers therein, and a second pair of oppositely directed arms extending from the opposite end of the body portion and shaped at their free end regions to provide a rocking bearing between the cage and the housing.

2. A vehicle brake asembly as set forth in claim 1, wherein said cage is provided with an outwardly deformed region constituting said bearing means.

3. A vehicle brake assembly as set forth in claim 1, wherein the shaped end regions of said second pair of arms are curved to constitute said bearing means.

4. A vehicle brake assembly as set forth in claim 3, wherein said housing further comprises an outwardly directed sleeve constituting said passage means and positioned at a region of said housing opposed to said chamber, said wedge member passing into said sleeve, and a trunnion in said sleeve receiving said wedge member to enable the latter to rock about the trunnion axis.

5. A vehicle brake assembly as set forth in claim 3, wherein said housing further comprises an outwardly directed sleeve constituting said passage means and positioned at a region of said housing opposed to said chamber, and said wedge member is formed remote from its wedge surfaces, with an internally hollow and externally part-spherical end generally of cup-like shape, the part-spherical exterior of the cup fitting the interior of said sleeve to constitute a bearing permitting said wedge member to rock within said housing, and a pull rod having one end received within the interior of said cup.

6. A vehicle brake assembly as set forth in claim 1, wherein the roller supporting arms of the cage are formed with roller receiving holes of generally pear-shaped configuration directed substantially transversely of said arms with their narrower ends innermost.

7. A vehicle brake assembly as set forth in claim 6, wherein said holes are each in the form of a modified 30°-60°-90° triangle having its apices radiused to accept the curvature of the roller portions received therein.

References Cited by the Examiner

UNITED STATES PATENTS 3,037,584   6/1962   Cox et al. _____ 188—78

FOREIGN PATENTS 928,181   6/1963   Great Britain.

MILTON BUCHLER, *Primary Examiner.*

B. S. MOWRY, *Assistant Examiner.*